(12) United States Patent
Poullin

(10) Patent No.: US 6,924,763 B2
(45) Date of Patent: Aug. 2, 2005

(54) CLUTTER REJECTION IN A PASSIVE RADAR RECEIVER OF OFDM SIGNALS

(75) Inventor: Dominique Poullin, Chatillon (FR)

(73) Assignee: ONERA, Chatillon (FR)

( * ) Notice: Subject to any disclaimer, the term of this patent is extended or adjusted under 35 U.S.C. 154(b) by 0 days.

(21) Appl. No.: 10/470,713

(22) PCT Filed: Jan. 18, 2002

(86) PCT No.: PCT/FR02/00224

§ 371 (c)(1),
(2), (4) Date: Jul. 30, 2003

(87) PCT Pub. No.: WO02/063335

PCT Pub. Date: Aug. 15, 2002

(65) Prior Publication Data

US 2004/0066331 A1  Apr. 8, 2004

(30) Foreign Application Priority Data

Feb. 7, 2001   (FR) ............................................. 01 01695

(51) Int. Cl.$^7$ .............................. G01S 7/41; G01S 7/42
(52) U.S. Cl. ......................... 342/159; 342/89; 342/160; 342/162; 342/175; 342/192; 342/195; 342/196
(58) Field of Search ................................ 375/130–153; 342/27, 28, 59, 89–103, 134, 135, 159–175, 192–197

(56) References Cited

U.S. PATENT DOCUMENTS

| | | | | |
|---|---|---|---|---|
| 3,831,174 A | * | 8/1974 | King et al. ................... | 342/90 |
| 3,972,041 A | * | 7/1976 | Howard ....................... | 342/89 |
| 3,987,442 A | * | 10/1976 | McLeod, Jr. ................ | 342/162 |
| 4,137,533 A | * | 1/1979 | Briechle et al. ............ | 342/162 |
| 4,617,568 A | * | 10/1986 | Mutoh ........................ | 342/160 |
| 4,618,864 A | * | 10/1986 | Martin et al. ............... | 342/162 |
| 5,973,642 A | | 10/1999 | Sollenberger et al. | |
| 6,400,306 B1 | * | 6/2002 | Nohara et al. .............. | 342/160 |

FOREIGN PATENT DOCUMENTS

| | | |
|---|---|---|
| EP | 0 681 190 A | 11/1995 |
| FR | 2 776 438 A | 9/1999 |

\* cited by examiner

Primary Examiner—Bernarr E. Gregory
(74) Attorney, Agent, or Firm—Lowe, Hauptman & Berner, LLP

(57) ABSTRACT

The invention concerns a passive radar receiver for a received orthogonal frequency division multiplex-type signal consisting of symbol frames each emitted on coded orthogonal carriers. After formatting the received signals into digital symbols ($S_1$ $S_1$), a filtering circuit (2) eliminates by subtraction or using a covariance matrix, in the symbol signal at least unwanted signals with null Doppler effect so as to apply a filtered signal (X') including essentially signals backscattered by mobile targets to a Doppler-distance correlator (4).

21 Claims, 5 Drawing Sheets

US 6,924,763 B2

CLUTTER REJECTION IN A PASSIVE RADAR RECEIVER OF OFDM SIGNALS

CROSS-REFERENCE TO RELATED APPLICATIONS

This application is a national phase of the PCT International Application No. PCT/FR02/00224 filed Jan. 18, 2002, which is based on the French Application No. 01-01695 filed Feb. 07, 2001.

BACKGROUND OF THE INVENTION

1. Field of the Invention

The present invention relates to a passive radar receiver receiving a radio signal comprising frames of symbols each emitted on orthogonal coded carriers.

2. Description of Related Art

In the radar field, it is generally difficult, if not impossible, to achieve the theoretically achievable detection performance limits for a mobile target. This is because detection performances are conditioned by the signal to thermal noise ratio at the output of a tuned filter in the radar receiver and in practise is generally limited not by thermal noise but by clutter at the output of the tuned filter. In the present context the term clutter is to be interpreted in the wide sense of all paths with zero Doppler effect. For example, for a bistatic radar with distant emitter and receiver, the clutter designates all of the following paths: the direct path from the emitter and each path received following reflection by a fixed obstacle.

Various methods of rejecting these unwanted signals are known in the art but have nonnegligible drawbacks. For example, adaptive rejection methods based on using a covariance matrix of the signals received by an array of sensors have the following limitations:

They eliminate only a limited number of decorrelated interference signals, characterized by their direction. Consequently, these methods are not optimized in the context of the fight against clutter when the latter is rich in multiple paths with different time-delays.

They lead to the creation of blind axes, associated with the rejected signals, on which it becomes impossible to detect a target.

They reject only signals whose signal to noise ratio is positive after angular compression. This rejection is limiting if it is effected at the beginning of radar processing, i.e. before distance-Doppler compression.

The invention is more particularly directed to the rejection of all zero Doppler effect signals in the clutter picked up by a passive radar receiver of particular orthogonal frequency division multiplex (OFDM) signals. OFDM signals are characterized by simultaneously emitting a large number of orthogonal sub-carriers phase coded with plural phase states or amplitude states, i.e. by a spectrum of orthogonal lines, in the Fourier transform sense, over a finite duration T, equidistant at intervals 1/T.

A bistatic radar disclosed in the French patent application FR 2776438 processes coded OFDM (COFDM) digital radio signals in the context of radio and television broadcasts conforming to the European Digital Audio Broadcasting (DAB) and Digital Video Broadcasting (DVB) standards. These signals, which are therefore sent by emitters of opportunity in the case of passive radar receiver applications, ensure optimum use of the spectrum emitted, in a similar manner to white noise, and are resistant to multipath propagation and interference.

According to the above patent application the radar receiver comprises a plurality of receive antennas for detecting the signals. The radar processing is based on Doppler-distance correlation of the signals received with a emitted signal time reference. The time reference is obtained by decoding the signals recorded conforming to the radio telecommunications operations effected.

However, because of the bistatic nature of the radar system, the power of the direct path signal is high compared to that of the wanted signal reflected by a target. The direct path should be rejected before effecting the Doppler-distance correlation. The energy contained in the distance-Doppler secondary lobes of the direct path is generally significantly higher than the thermal noise, so that targets situated in the vicinity of the direct path are difficult to detect.

OBJECT OF THE INVENTION

An object of the invention is to reduce or even to eliminate the contribution of the direct path and more generally of unwanted zero Doppler effect signals to the processing of received signals prior to the Doppler-distance correlation.

BRIEF SUMMARY OF THE INVENTION

In order to reach this object, a radar receiver according to the invention, processing a radio signal received via a propagation channel and comprising frames of symbols each emitted on coded orthogonal carriers, comprising shaping means for converting the received signal into a digital symbol signal and Doppler-distance correlation means for discriminating mobile targets, is characterized in that it comprises filtering means for eliminating in the symbol signal at least unwanted zero Doppler effect signals in order to apply a filtered signal including essentially signals back-scattered by targets to the correlation means.

In a first embodiment, in particular for a radar having only one receive channel, the filtering means comprises means for producing spectral lines of the symbol signal corresponding to the orthogonal carriers, means for detecting the unwanted zero Doppler effect signals by estimating coefficients of the transfer function of the propagation channel in the respective spectral lines, means for subtracting the spectral lines of the unwanted zero Doppler effect signals deduced from the coefficients of the estimated transfer function from the spectral lines of the symbol signal, and means for synthesizing the spectral lines produced by the subtraction means into the filtered signal. This first embodiment eliminates unwanted zero Doppler effect signals, i.e. essentially signals caused by direct and multiple paths from a given emitter.

To better characterize the transfer function of the propagation channel independently of signals backscattered from targets, the spectral lines of the unwanted signals are estimated for each symbol and averaged over each frame in the detecting means before being subtracted from the spectral lines of the symbol signal. This first embodiment provides then a means for estimating an emitted signal replica as a function of the spectral lines of the unwanted zero Doppler effect signals, the estimated replica being correlated to the filtered signal in the Doppler-distance correlation means.

According to a second embodiment for a radar having several receive channels, in which the shaping means comprises a plurality of receiver means and shapes a plurality of signals received by the receiver means in the form of digital symbol signals, the filtering means comprises means for producing groups of spectral lines of the symbol signals respectively corresponding to the orthogonal carriers, means for estimating covariance matrices each depending on products of spectral lines two by two in a group relating to a respective carrier, means for deducing inverse matrices of the covariance matrices, means for filtering the groups of spectral lines respectively relating to the carriers by multiplying the groups of lines by the respective inverse matrices to produce filtered groups of spectral lines and means for synthesizing the filtered groups of spectral lines into filtered symbol signals including essentially signals backscattered by targets applied to the correlation means. This second embodiment also eliminates scatterers other than COFDM coded correlated signals.

To better characterize the transfer function of the propagation channel, spectral line products on which the covariance matrices are dependent depend on spectral lines of symbols and are averaged over each frame.

The second embodiment provides also a means for estimating an emitted signal replica as a function of the spectral lines of one of the symbols signals by estimating coefficients of the transfer function of the propagation channel in the unwanted zero Doppler effect signals, the estimated replica being correlated to the filtered symbol signals in the correlation means.

BRIEF DESCRIPTION OF THE DRAWINGS

Other features and advantages of the present invention will become more clearly apparent on reading the following description of a plurality of preferred embodiments of the invention given with reference to the corresponding accompanying drawings, in which.

DESCRIPTION OF THE PREFERRED EMBODIMENTS

Figure 1:
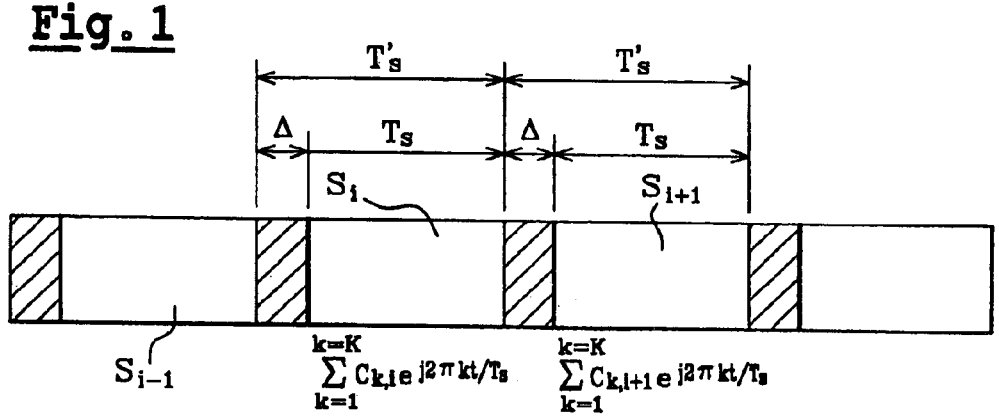
FIG. 1 is a timing diagram of successive symbols in an emitted COFDM signal.

The main characteristics of COFDM radiocommunication signals are summarized hereinafter, with reference to FIG. 1.

These baseband signals are emitted in symbol periods $T'_S$. A message contained in each of the emitted symbols is carried by a large number of sinusoids emitted simultaneously. These sinusoids constitute sub-carriers, referred to hereinafter for simplicity as "carriers", and are phase coded or amplitude coded. The carrier frequencies $f_1$ to $f_K$ are equidistant at intervals $1/T_S$. Each symbol $S_i$ emitted is the result of summing carriers as follows during the time period $T'_S$ ($T'_S > T_S$):

$$S_i = \sum_{k=1}^{k=K} C_{k,i} e^{2j\pi kt/T_S}$$

in which j designates the square root of $-1$ ($j^2 = -1$) and t designates time.

The carriers at frequencies $f_k = k/T_S$ with $1 \leq k \leq K$ are therefore orthogonal to the duration $T_S$. $\Delta = T'_S - T_S$ designates the guard time.

Over an analysis period $T_S$, the COFDM signals thus constitute a band signal $K/T_S$ comprising a spectrum of K lines equidistant at the frequency step $1/T_S$ and each of width $1/T_S$. The carriers are modulated individually, for example using a four-state phase code expressed by the complex coefficients $C_{k,i}$, belonging to the alphabet (1+j, 1−j, −1+j, −1−j).

In practise, a data message may occupy only a few frequencies $f_k$ over a few symbol period $T'_S$ in the time-division and frequency-division multiplex comprising K frequencies and I time slots.

Figure 2:
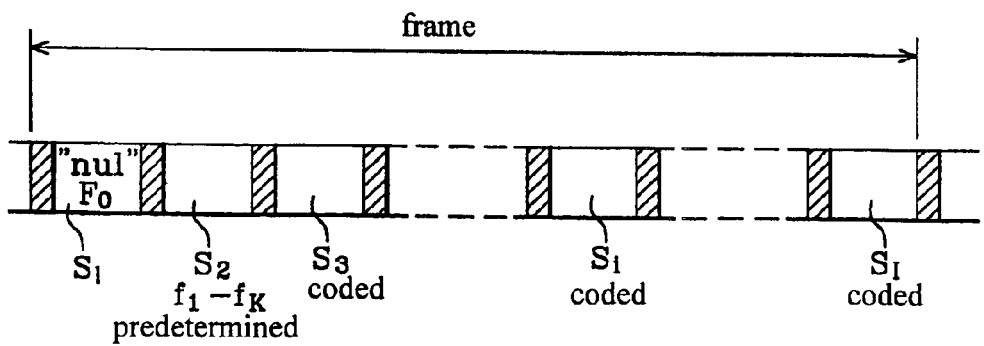
FIG. 2 is a timing diagram of a COFDM signal frame.

On emission, the symbols are organized into frames. Each frame shown in FIG. 2 comprises I symbol $S_1$ to $S_I$. The first symbol $S_1$ of the frame is a "null" symbol carrying no information and consists of the modulation carrier frequency $F_0$ of the emitted signal. The symbol $S_1$ is used for frame synchronization, i.e. to provide a time reference. The second symbol $S_2$ of the frame is used in the radar receiver, among other things, to learn the propagation channel, and contains the K carriers or sinusoids at the frequencies $f_1$ to $f_K$ having predetermined phases in the emitter. These K carriers in the symbol $S_1$ are used in the radar receiver to estimate the emitted signal, each carrier $f_k$ serving as a frequency and phase reference. Thanks to the first two symbols, at least the emission parameters $F_0$, $T_S$ and $f_1$ to $f_K$ can be acquired in this way. The other symbols $S_3$ to $S_I$ are intended to carry one or more data messages occupying each symbol partially or otherwise.

In radiocommunication, the received symbols are recovered with the aid of a frequency analysis of the received COFDM signals received over the time period $T_S$. The frequencies emitted being orthogonal in the Fourier transform (FFT) sense, each of the carriers is demodulated to reconstitute the information.

In practise, the orthogonality of the frequencies emitted is degraded by the following forms of interference:

intersymbol intracarrier interference: overlapping of signals coded differently or analysis time $T_S$ not suitable for the code;

intersymbol intercarrier interference: non-orthogonal signals over the analysis time $T_S$;

intrasymbol intracarrier interference: overlapping of signals coded differently;

intrasymbol intercarrier interference: non-stationary signals.

These interferences are associated with the multiple paths in the propagation channel between the emitter and the receiver.

The addition on the guard time $\Delta$ to each symbol period $T'_S$ eliminates all kinds of interference if the guard time $\Delta$ is greater than the temporal spreading of the propagation channel caused by multiple paths: there is then for each duration $T'_S$ a range, of length $T_S$, in which all the received multipath signals are coded identically.

The processing of the received signals including Doppler-distance correlation, the ambiguity function of the COFDM signals, and in particular of their secondary lobes, must be studied. The secondary lobes of the ambiguity function associated with the COFDM waveform are relatively uniform in the distance-Doppler plane, and their level relative to the main lobe is $-10.\log_{10}(I.K)$. The secondary lobes are lower at the base of the main lobe.

The analysis of the conventional radar balance shows that in general the energy contained in the secondary lobes associated with the direct path dominates over thermal noise.

Figure 3:
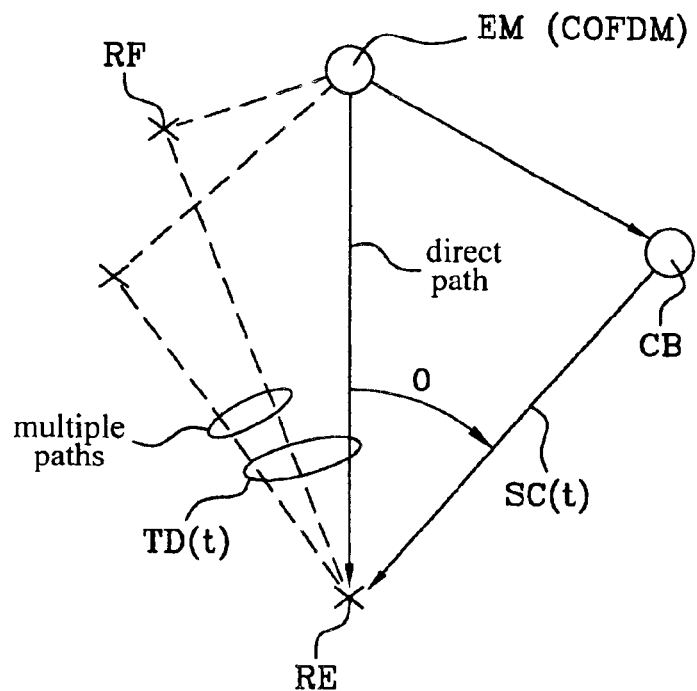
FIG. 3 is a diagram of the following paths between an emitter and a receiver: a direct path, multiple paths, and a path reflected by a target.

Consider for example the bistatic radar shown in FIG. 3 with an emitter EM radiating an electromagnetic power of $P_e G_e=1\,000$ W, a receiver RE antenna gain of $G_r=10$ dB, a wavelength of $\lambda=1$ m corresponding to the frequency $F_0=300$ MHz, an receiver distance of d=40 km, an emitter-target distances EM-CB and a target-receiver distances CB-RE equal to 40 km, a noise factor of F=6 dB, a radar equivalent surface SER=0 dB, I=100 symbols of duration $T_S=1$ ms and a guard time of 250 µs for a frame duration of 125 ms, and K=1 500 carriers for a bandwidth of B=1.5 MHz.

Figure 4:
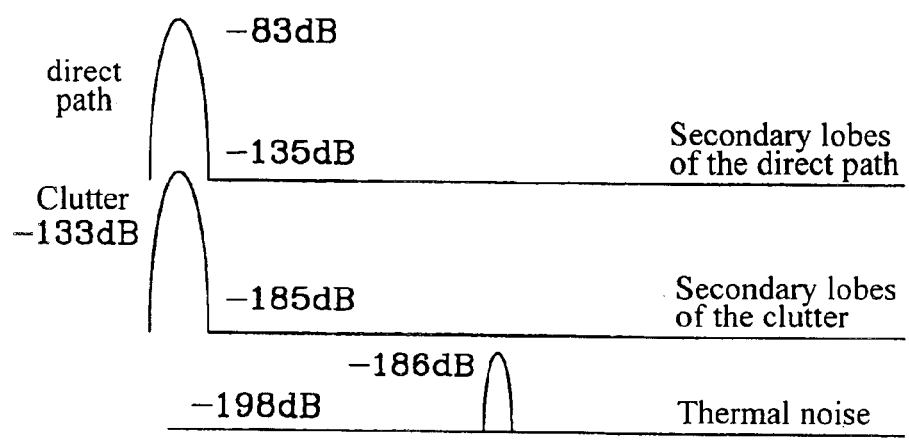
FIG. 4 shows the outputs of the various contributors (direct path, multiple paths, target, noise) to the output of the correlator.

FIG. 4 shows the link balance between the emitter EM and the receiver RE.

The energy contained in the secondary lobes attached to the direct path and to the clutter caused by the multiple paths dominates over thermal noise. The direct path lobe energy level is 186−135=51 dB above the presumed level of the target, which has a signal to thermal noise ratio of 198−186=12 dB.

The invention therefore aims to reject effectively the direct path and clutter in a received broadband signal before Doppler-distance correlation in order to detect mobile targets.

Figure 5:
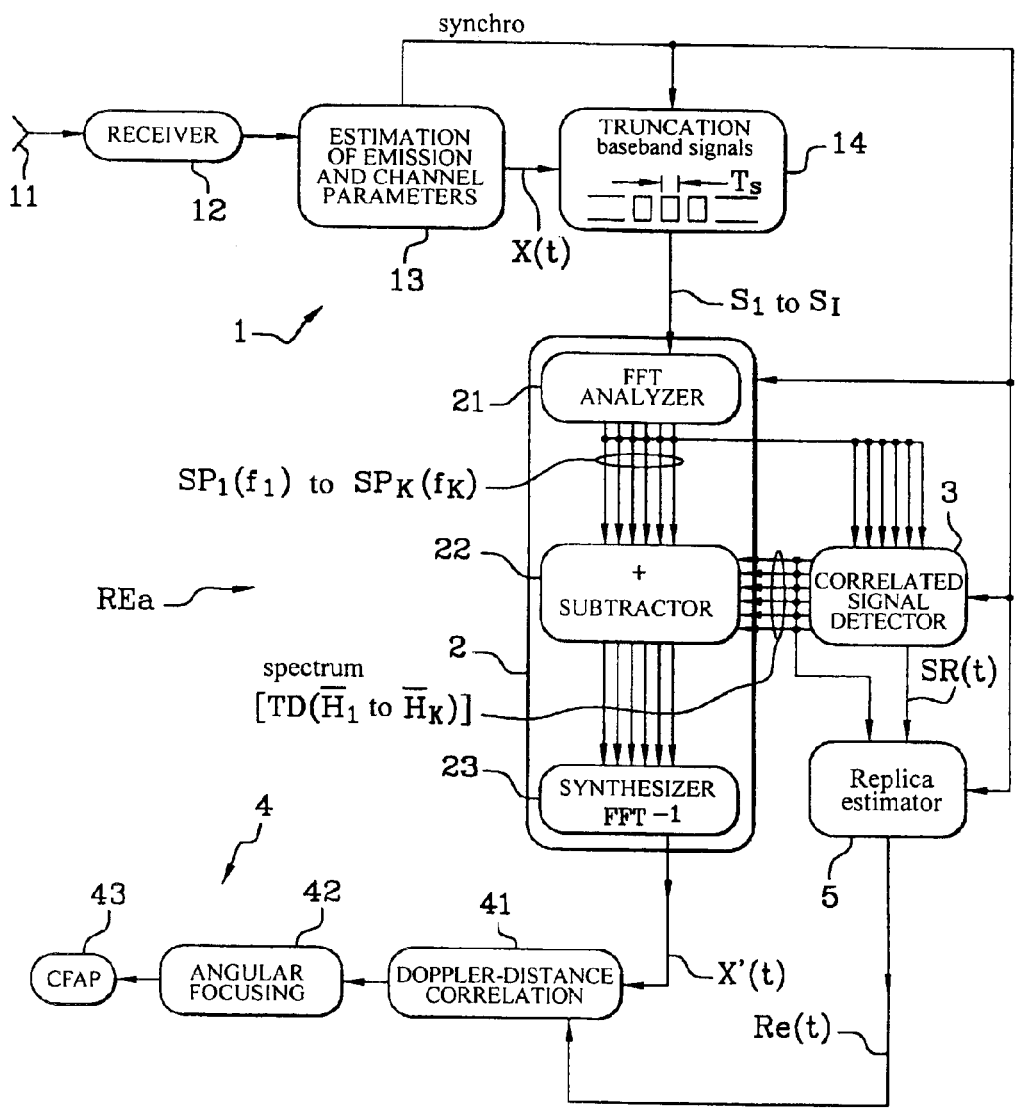
FIG. 5 is a schematic block diagram of a radar receiver with one antenna conforming to a first embodiment of the invention.

FIG. 5 shows a passive radar receiver Rea in accordance with the invention for OFDM signals that comprises a received signal shaping circuit 1, a correlated signal filtering circuit 2, a correlated signal detector 3, a target discriminator circuit 4, and an emitted signal replica estimator 5.

The received signal shaping circuit 1 conventionally comprises at its input an antenna 11 and an OFDM radio frequency receiver stage 12 analogous to those for receiving OFDM radio and television broadcast signals. Following frequency conversion, the receiver stage 12 digitizes the next baseband radio signal X(t) received and applies it to a emission parameter and channel estimator circuit 13:

$$X(t)=TD(t)+SC(t)+B(t),$$

where for each symbol emitted $$\sum_{k=1}^{k=K} C_k e^{2j\pi kt/T_S},$$

ignoring the index i of the symbol $S_i$:

$$-TD(t) = \sum_{k=1}^{k=K} H_k C_k e^{j2\pi kt/T_S}$$

designates an OFDM signal received from at least one emitter EM or possibly from a plurality of OFDM emitters on direct paths and multiple paths caused by fixed reflectors RF and corresponding to clutter, as shown in FIG. 3. $H_k$ designates a complex coefficient corresponding to the transfer function of the propagation channel EM-REa relating to these paths for the line $f_k$; the signal TD(t) is constituted by overlapping unwanted zero Doppler effect signals caused by direct and multiple paths; these unwanted signals are referred to as "correlated signals";

$$-SC(t) = \sum_{k=1}^{k=K} h_c C_k e^{j2\pi k(t-\tau)/T_S} e^{-j2\pi\nu t}$$

designates a received OFDM signal caused by backscattering of emitted OFDM signals by at least one mobile target CB and thus subject to a non-zero Doppler effect; it constitutes the wanted signal to be extracted, whose power is very low compared to that of the correlated signal TD(t); $h_c$ is the narrowband transfer function of the target CB, τ denotes the path difference between the direct path and the path reflected by the target, and ν is the Doppler frequency of the target;

B(t) designates signals received in the wanted bandwidth, called scatterers, other than the correlated OFDM signals, such as interference and thermal noise signals.

The circuit 13 estimates the parameters of the emitted signal, such as the carrier frequency $F_0$ and the symbol period $T_S$, as a function of an analysis of the first two symbols $S_1$ and $S_2$ of a frame (FIG. 2) in order to constitute a time reference. Knowing the period $T'_S$ of the emitted signal and the duration $T_S$ of each symbol, the temporal length of the channel is deduced from the process of synchronizing the preceding time reference, by analyzing the signal received in each guard time Δ, which is greater than the temporal channel length.

The received signal is then periodically truncated in a truncator circuit 14. The stationary portion of the received symbols of duration $T_S$ is recovered by subtracting the signal portion received in the guard time Δ of each period $T'_S$ and in particular by subtracting the channel length deduced in each period.

Each portion of the received digital baseband signal of duration $T_S$ is then applied to a Fourier analyzer 21 at the input of the filtering circuit 2. The analyzer produces the real and imaginary components of the received signals for each duration $T_S$ using the Hilbert transform and analyzes them using the fast Fourier transform (FFT) to supply the frequency spectrum of each symbol $S_i$ delivered by the truncator circuit 14. The K spectral lines $SP_1$ to $SP_K$ of the symbol relating to the frequencies $f_1$ to $f_K$ are applied to the detector 3 and to first inputs of a subtractor 22. The information carried by each spectral line $SP_k$ relating to a frequency emitted independently of the other frequencies is related on the one hand to the coding of the corresponding spectral line and on the other hand to the transfer function $H_k$ of the propagation channel.

During a recurrent learning phase in each symbol frame, the detector 3 subtracts from the spectral lines of each symbol of the frame the spectral lines of a reference signal SR(t), such as:

$$SR(t) = \sum_{k=1}^{k=K} \overline{H}_k C_k e^{j2\pi kt/T_S} + b(t).$$

$\overline{H}_k$ is the mean of the I-1 coefficients of the propagation channel transfer function for the line $SP_k$ during the symbols $S_2$ to $S_I$ of the frame, in other words virtually $|\overline{H}_k|=|H_k|$, which improves the estimate of the transfer function of the channel by making it less dependent on the instantaneous amplitude and phase variations. This averaging means that the backscattered target signal SC(t) can be ignored and thus the propagation channel and the correlated signals can be characterized. The noise signal b(t) designates a mean of scatterers received during the frame, consisting essentially of thermal noise with a variance lower than that of the scatterers B(t).

After storing the transfer function coefficients $\overline{H}_1$ to $\overline{H}_K$ averaged over a frame, the detector 3 applies the spectral lines of the zero Doppler effect correlated signals averaged over a frame, i.e. the averaged lines of the signal SR(t) depending on the coefficients $\overline{H}_1$ to $\overline{H}_K$ at K second inputs of the subtractor 22. The subtractor subtracts the lines of the signal SR(t) from the spectral lines $SP_1$ to $SP_K$ of the received signal relating to each symbol $S_2$ to $S_I$ of the frame. The subtractor 22 then produces spectral lines of a filtered signal:

$$X'(t)=SC(t)+B(t)-b(t)$$

in which the contribution of correlated signals with zero Doppler effect caused by the direct path and the multiple paths is eliminated by subtracting $H_k-\overline{H}_k=0$ for each respective frequency $f_k$.

In the filtering circuit 2, the lines of the signal X'(t) are synthesized using an inverse fast Fourier transform $FFT^{-1}$ in a synthesizer 23 which reconstitutes the stream of symbols of the digital signal X'(t) comprising primarily the target backscatter signal SC(t). The signal X'(t) is applied to the target discriminator circuit 4.

In parallel with this, the emitted signal replica estimator 5 receives the coefficients $\overline{H}_k=H_k$ of the transfer function of the channel estimated by the detector 3 and the spectral densities of the reference signal SR(t), in order to estimate a replica Re(t) of the signal emitted:

$$Re(t) = \sum_{k=1}^{k=K} C_k e^{j2\pi kt/T_S}.$$

In a similar manner to a Doppler channel of the radar receiver disclosed in the French patent application FR 2776438, the target discriminator circuit 4 includes a Doppler-distance correlator 41. Doppler channels in the correlator 41 are assigned a predetermined frequency offset relative to each other because of the Doppler effect. The Doppler channels constitute a plurality of speed cases of the filtered signal X'(t) by changes of frequency and are each correlated, for each carrier $f_1$ to $f_K$, to the emitted signal replica Re(τ). After summation, an angular focusing circuit 42 determines mobile targets angular position cases. Finally, a constant false alarm processing (CFAP) circuit 43 extracts "plots" relating to position and speed data on searched-for mobile targets.

Although this first embodiment has been described for a bistatic radar, it can be applied to a monostatic radar. It can also be used in a radar with a plurality of receive antennas and therefore a plurality of filtering operations by subtracting spectral lines depending on transfer function coefficients $\overline{H}_1$ to $\overline{H}_K$ for the K spectral lines relating to each receive antenna in the filtering circuit 2, which produces as many filtered signals X'(t) as there are antennas to be processed in parallel in the Doppler channels of the circuit 4, as in the circuit 4b shown in FIG. 6.

In the embodiment described above with reference to FIG. 5, the received signal X(t) is processed to eliminate the contribution of the direct path and the multiple paths between at least one COFDM emitter EM and the receiver REa. However, scatterers, such as interference and thermal noise in the wanted frequency band, are not eliminated in the signal X'(t) processed by the correlator 41.

Figure 6:
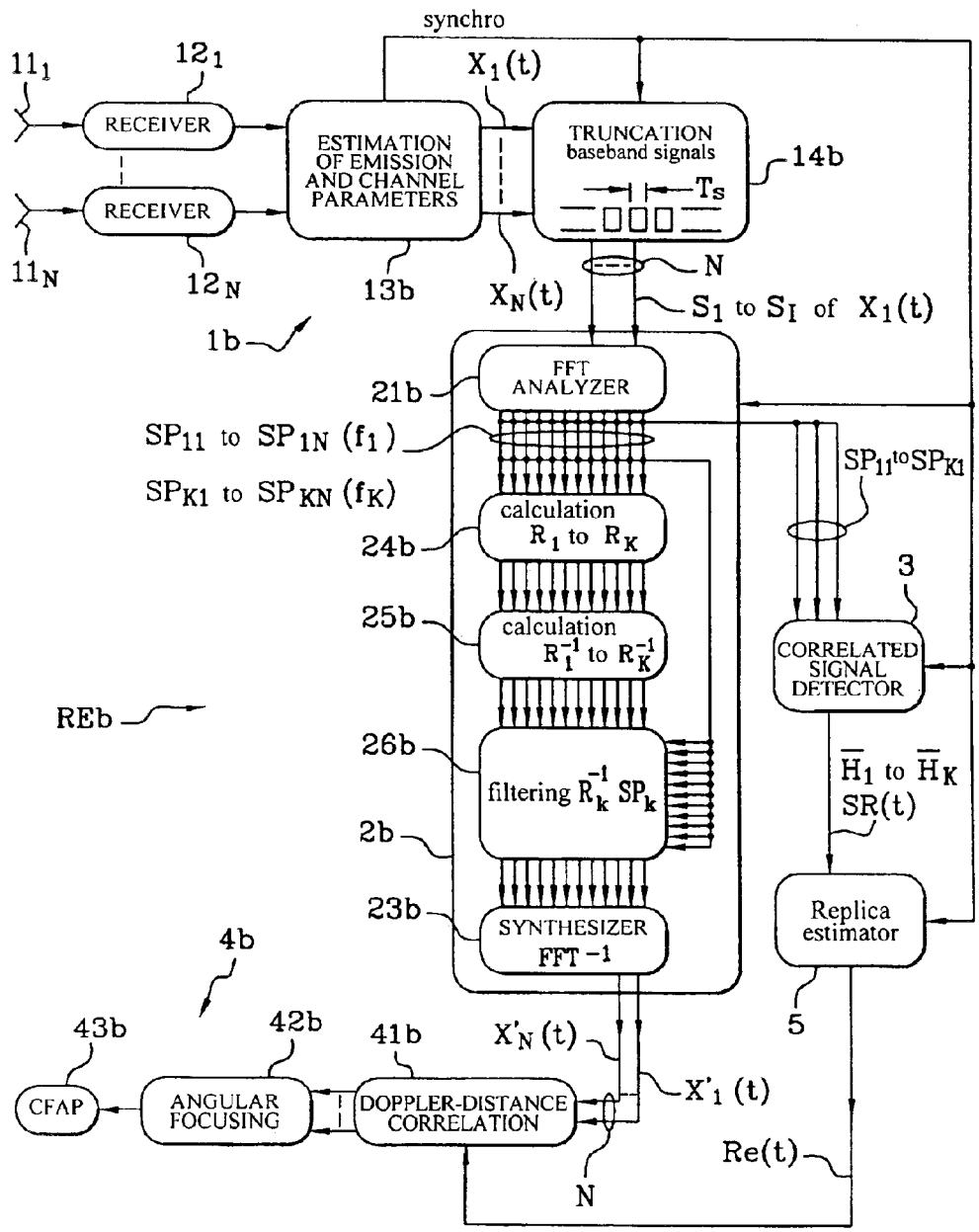
FIG. 6 is a schematic block diagram of a radar receiver with a plurality of antennas conforming to a second embodiment of the invention.

In a second embodiment, shown in FIG. 6, the radar receiver REb aims to eliminate all correlated unwanted signals and scatterers.

The receiver REb for COFDM signals comprises a plurality of receiver antennas $11_1$ to $11_N$ connected to a plurality of receivers $12_1$ to $12_N$, respectively, with N≧2. The radar receiver REb has a structure identical to that of the receiver REa shown in FIG. 5, but with N parallel receive channels between the circuits 13b, 14b, 2b and 4b respectively associated with the antennas $11_1$ to $11_N$.

The detector 3 and the replica estimator 5 are not modified. The detector 3 produces the reference signal SR(t) relating to one of the antennas $11_1$ to $11_N$, for example as a function of the K spectral lines $SP_{11}$ to $SP_{K1}$ of the first channel connected to the antenna $11_1$, which are delivered by the spectrum analyzer 21b which analyzes N received symbol streams supplied by the truncator circuit 14b. The estimator 5 produces a narrowband emitted signal replica Re(t) applied to N Doppler-distance correlators 41b in the target discriminator circuit 4.

The receiver REb essentially differs from the receiver REa in the narrowband filtering circuit 2b which eliminates unwanted zero Doppler effect signals TD(t) and scatterers B(t).

The filtering circuit 2b comprises, between the spectrum analyzer 21b producing in parallel K spectral lines for each symbol of the received signals $X_1(t)$ to $X_N(t)$ and the Fourier synthesizer 23b supplying N filtered signals $X'_1(t)$ to $X'_N(t)$ to the correlators 41b, successively a covariance matrix calculation module 24b, an inverse covariance matrix calculation module 25b, and a filtering module 26b.

For each line $SP_k$ at the frequency $f_k$ delivered by the analyzer 21b, the module 24b estimates an N×N covariance matrix $R_k$ in which a row of given rank n is made up of products of the spectral line $SP_{kn}$ received relating to a given antenna $11_n$ by the conjugates of the received spectral lines $SP_{k1}$ to $SP_{kN}$ relating to the N antennas $11_1$ to $11_N$, the products being averaged for symbols having a predetermined duration, with $1 \leq n \leq N$. The predetermined duration for averaging said products is preferably significantly longer than the symbol period $T_S$, and is typically the duration of a frame, i.e. products averaged over I-1 symbols $S_2$ to $S_I$. Averaging said products over a large number of symbols, i.e. over around a hundred symbols constituting the frame, decorrelates the target signal from the unwanted signals received by the antennas at a high level. The mutual orthogonal relationship of the spectral lines makes the covariance matrices $R_1$ to $R_K$ independent of the coding.

The module 25b then deduces the inverse matrices $R_1^{-1}$ to $R_K^{-1}$ of the K covariance matrices and stores them. These K N×N inverse matrices serve as K filters in the module 26b for filtering K respective groups each of N spectral lines $SP_{11}-SP_{1N}$ to $SP_{K1}-SP_{KN}$ delivered by the analyzer 21b. Each group of N spectral lines $SP_{k1}$ to $SP_{kN}$ received for a given frequency $f_k$ is thus filtered by a filter which for each symbol supplies the product of the column vector composed of N received spectral lines $SP_{k1}-SP_{kN}$ for that symbol and the frequency $f_k$ by the inverse matrix $R_k^{-1}$. The N groups each of K filtering signals supplied by the filtering module 26b are then applied to the synthesizer 23b which delivers N symbol time signals $X'_1(t)$ to $X'_N(t)$ in the correlators 41b. In the target discriminator circuit 4b, the N correlators 41b are followed by angular focusing circuits 42b and a CFAP circuit 43b.

Figure 7:
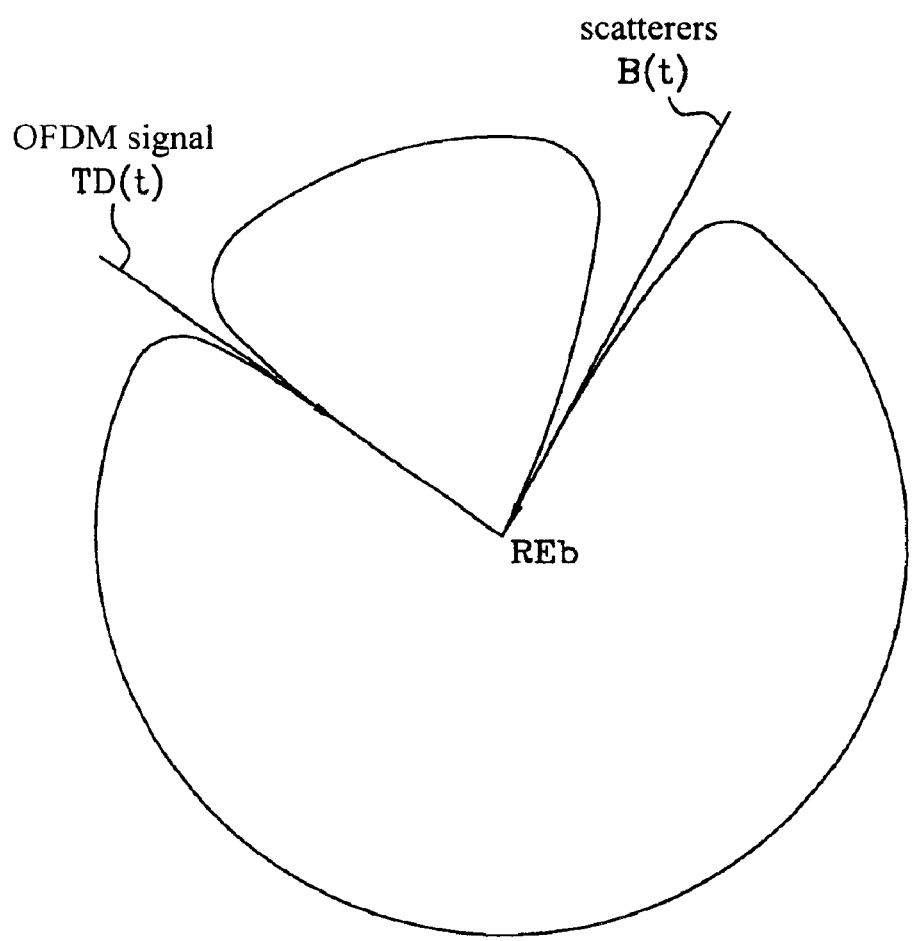
FIG. 7 is a radiation diagram of the antenna array of the second embodiment of a radar receiver.

The radiation diagrams of the signals $X'_1(t)$ to $X'_N(t)$ has blind axes, i.e. "gaps" in the directions for receiving correlated OFDM signals and scatterers, as shown in FIG. 7.

What is claimed is:

1. A radar receiver adapted to process a radio signal received via a propagation channel and comprising COFDM frames of symbols, each symbol being coded on a plurality of emitted orthogonal carriers, said radar comprising shaping means for converting said received signal into a digital symbol signal, Doppler-distance correlation means for discriminating mobile targets, and filtering means for, eliminating in said symbol signal at least unwanted zero Doppler effect signals in order to apply a filtered signal including essentially signals backscattered by targets to said correlation means.

2. The radar receiver according to claim 1, wherein said filtering means comprises means for producing spectral lines of said symbol signal corresponding to said orthogonal carriers, means for detecting said unwanted zero Doppler effect signals respectively in said spectral lines by estimating coefficients of a transfer function of said propagation channel for thereby deriving spectral lines of said unwanted zero Doppler effect signals deduced from the estimated coefficients of said transfer function, means for subtracting said spectral lines of said unwanted zero Doppler effect signals from said spectral lines of said symbol signal, and means for synthesizing spectral lines produced by said subtraction means into said filtered signal.

3. The radar receiver according to claim 2, wherein said spectral lines of said unwanted zero Doppler effect signals are estimated for each symbol and averaged over each frame in said detecting means before being subtracted from said spectral lines of said symbol signal.

4. A radar receiver according to claim 2, comprising means for estimating an emitted signal replica as a function of said spectral lines of said unwanted zero Doppler effect signals, said estimated replica being correlated to said filtered signal in said correlation means.

5. A radar receiver according to claim 1, wherein said shaping means comprises a plurality of receivers for shaping a plurality of signals received by said receivers in the form of digital symbol signals, and said filtering means comprises means for producing groups of spectral lines of said symbol signals respectively corresponding to said orthogonal carriers, means for estimating covariance matrices each depending on products of spectral lines of said symbol signals two by two in a group relating to a respective carrier, means for deriving inverse matrices of said covariance matrices, means for filtering said groups of spectral lines respectively relating to said carriers by multiplying said groups of spectral lines by said respective inverse matrices to produce filtered groups of spectral lines, and means for synthesizing said filtered groups of spectral lines into said form of filtered symbol signals which includes essentially signals backscattered by targets and which are applied to said correlation means.

6. The radar receiver according to claim 5, wherein said products of spectral lines of said symbol signals on which said covariance matrices are dependent depend on spectral lines of symbols and are averaged over each frame.

7. A radar receiver according to claim 5, comprising means for estimating an emitted signal replica as a function of said spectral lines of one of said symbols signals by estimating coefficients of a transfer function of said propagation channel, said estimated replica being correlated to said filtered symbol signals in said correlation means.

8. A radar receiver adapted to process a radio signal received via a propagation channel and comprising COFDM frames of symbols, each symbol being coded on a plurality of emitted orthogonal carriers, said radar comprising a converter for converting said received signal into a digital symbol signal, a Doppler-distance correlator for discriminating mobile targets, and a filter for eliminating in said symbol signal at least unwanted zero Doppler effect signals, the filter being connected to apply a filtered signal including signals backscattered by targets to said correlator.

9. The radar receiver according to claim 8, wherein said filter is arranged for:
(a) producing spectral lines of said symbol signal corresponding to said orthogonal carriers,
(b) detecting said unwanted zero Doppler effect signals respectively in said spectral lines by estimating coefficients of a transfer function of said propagation channel for thereby deriving spectral lines of said unwanted zero Doppler effect signals deduced from the estimated coefficients of said transfer function,
(c) subtracting said spectral lines of said unwanted zero Doppler effect signals from said spectral lines of said symbol signal, and
(d) synthesizing spectral lines produced by said subtracting into said filtered signal.

10. The radar receiver according to claim 9, wherein said filter is arranged for causing spectral lines of said unwanted zero Doppler effect signals to be (a) estimated for each symbol and (b) averaged over each frame during detecting of said unwanted zero Doppler effect signal and before being subtracted from said spectral lines of said symbol signal.

11. The radar receiver according to claim 9, wherein said filter is arranged for (a) estimating an emitted signal replica as a function of said spectral lines of said unwanted zero Doppler effect signals, and (b) correlating said estimated replica to said filtered signal.

12. The radar receiver according to claim 8, wherein said converter comprises a plurality of receivers for shaping a plurality of signals received by said receivers in the form of digital symbol signals, and said filter is arranged for (a) producing groups of spectral lines of said symbol signals respectively corresponding to said orthogonal carriers, (b) estimating covariance matrices each depending on products of spectral lines of said symbol signals two by two in a group relating to a respective carrier, (c) deriving inverse matrices of said covariance matrices, (d) filtering said groups of spectral lines respectively relating to said carriers by multiplying said groups of spectral lines by said respective inverse matrices to produce filtered groups of spectral lines, (e) synthesizing said filtered groups of spectral lines into said form of filtered symbol signals which includes essentially signals backscattered by targets, and (f) correlating the synthesized, filtered groups of spectral lines.

13. The radar receiver according to claim 12, wherein said filter is arranged for causing products of spectral lines of said symbol signals on which said covariance matrices are dependent to depend on spectral lines of symbols and to be averaged over each frame.

14. The radar receiver according to claim 12, wherein the filter is arranged for estimating an emitted signal replica as a function of said spectral lines of one of said symbol signals by estimating coefficients of a transfer function of said propagation channel, said estimated replica being correlated to said filtered symbol signals in said correlator.

15. A method of processing a radio signal received via a propagation channel and comprising COFDM frames of symbols, each symbol being coded on a plurality of emitted orthogonal carriers, said method comprising converting said received signal into a digital symbol signal, discriminating mobile targets by using Doppler-distance correlation, and eliminating from said symbol signal at least unwanted zero Doppler effect signals and correlating the signal having the unwanted Doppler effect signals eliminated from it so signals backscattered by targets are correlated.

16. The method according to claim 15, wherein the unwanted Doppler effect signals are eliminated from the symbol by:
   (a) producing spectral lines of said symbol signal corresponding to said orthogonal carriers,
   (b) detecting said unwanted zero Doppler effect signals respectively in said spectral lines by estimating coefficients of a transfer function of said propagation channel thereby deriving spectral lines of said unwanted zero Doppler effect signals deduced from the estimated coefficients of said transfer function,
   (c) subtracting said spectral lines of said unwanted zero Doppler effect signals from said spectral lines of said symbol signal, and
   (d) synthesizing spectral lines produced by said subtracting into said filtered signal.

17. The method according to claim 16, further including estimating said spectral lines of said unwanted zero Doppler effect signals for each symbol arid averaging said estimates of the spectral lines of said unwanted zero effect Doppler signals before they are subtracted from said spectral lines of said symbol signal.

18. The method according to claim 16, further comprising estimating an emitted signal replica as a function of said spectral lines of said unwanted zero Doppler effect signals, and correlating said estimated replica to said symbol signal having the unwanted zero Doppler effect signals estimated from it.

19. The method according to claim 15, wherein said converting (a) is performed by a plurality of receivers and (b) shapes a plurality of signals received by said receivers in the form of digital symbol signals, and said eliminating step includes (a) producing groups of spectral lines of said symbol signals respectively corresponding to said orthogonal carriers, (b) estimating covariance matrices each depending on products of spectral lines of said symbol signals two by two in a group relating to a respective, carrier, (c) deriving inverse matrices of said covariance matrices, (d) producing filtered groups of spectral lines by filtering said groups of spectral lines respectively relating to said carriers by multiplying said groups of spectral lines by said respective inverse matrices, and (e) synthesizing said filtered groups of spectral lines into said form of filtered symbol signals which includes essentially signals backacattered by targets and which are correlated.

20. The method according to claim 19, wherein said products of spectral lines of said symbol signals on which said covariance matrices are dependent depend on spectral lines of symbols and are averaged over each frame.

21. The method according to claim 19, further including estimating an emitted signal replica as a function of said spectral lines of one of said symbol signals by estimating coefficients of a transfer function of said propagation channel, and correlating said estimated replica to said filtered symbol signals.

* * * * *